Nov. 25, 1952  G. P. FUENTES  2,619,008
REARVIEW MIRROR UNIT
Filed June 11, 1951  2 SHEETS—SHEET 1
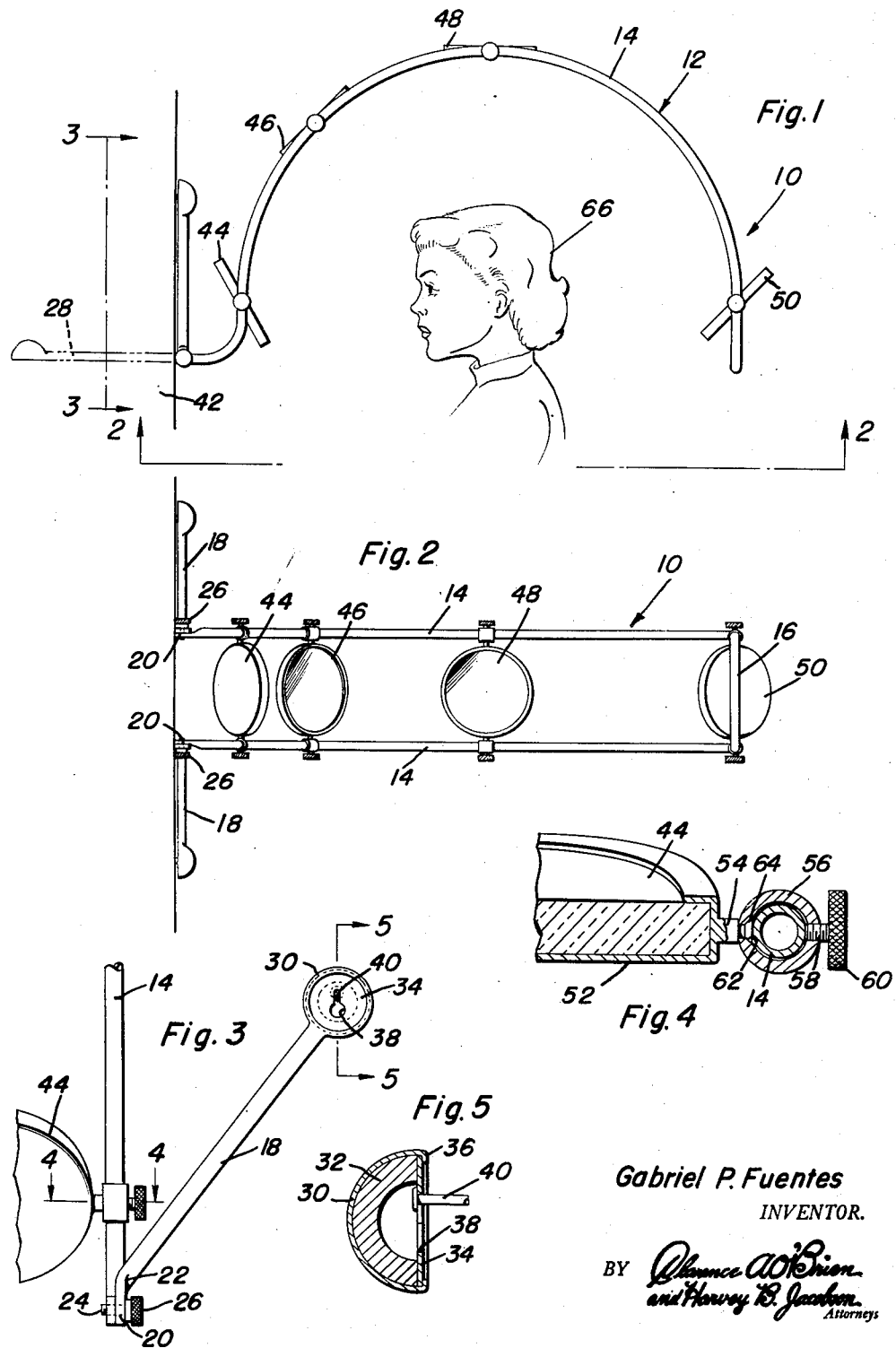
Gabriel P. Fuentes
INVENTOR.

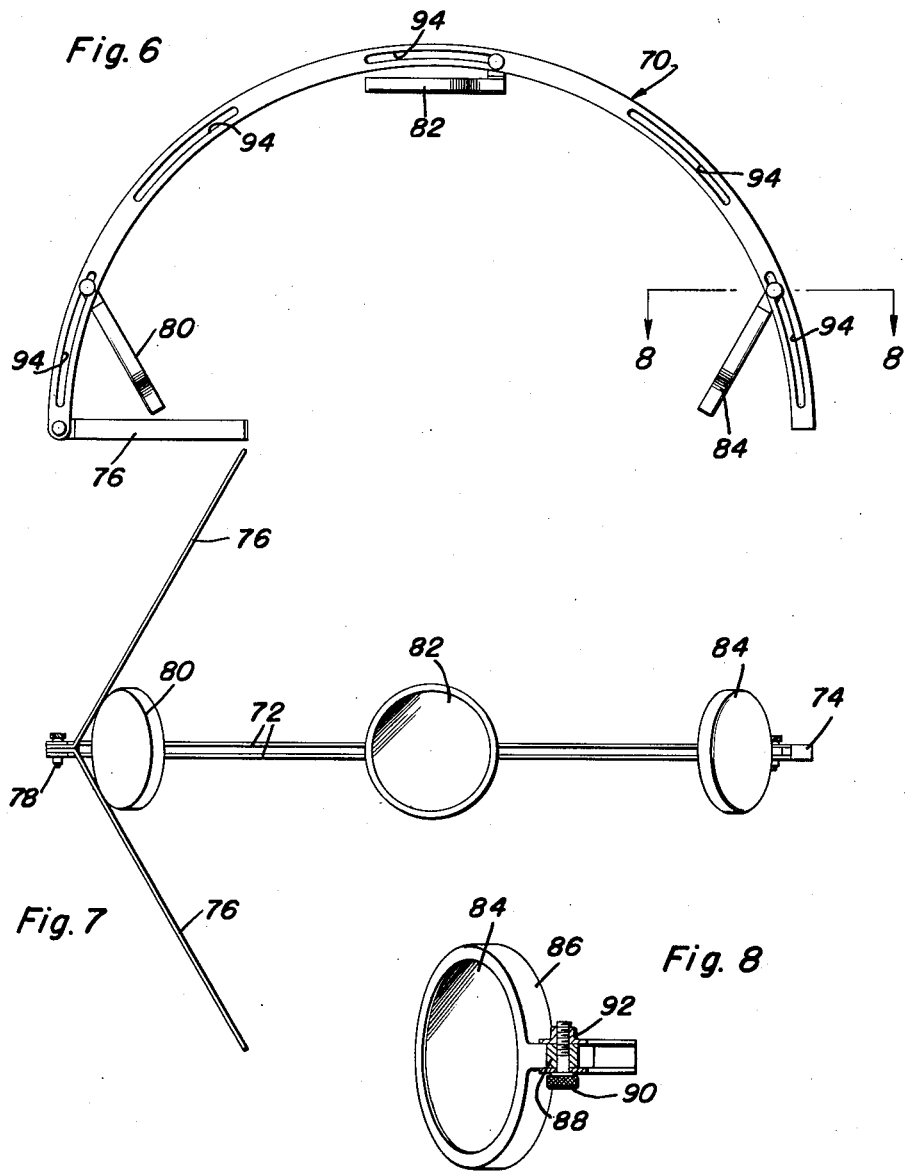

Patented Nov. 25, 1952

2,619,008

UNITED STATES PATENT OFFICE 2,619,008

REARVIEW MIRROR UNIT

Gabriel P. Fuentes, Bronx, N. Y.

Application June 11, 1951, Serial No. 231,035

1 Claim. (Cl. 88—97)

This invention relates to new and useful improvements in mirror units of the type permitting a person to readily inspect the front and the rear of his head.

The primary object of this invention is to provide a mirror unit of this type in which the necessary plurality of mirrors may be readily adjusted with respect to each other, and in which, during adjustment, the axes of the mirrors are retained in co-planar relation.

Another important object of this invention is to provide a unit of this character that will be pleasing in appearance, and in which the mirrors as well as the support therefor will not be in a position to interfere with such operations as dressing the hair.

Still a further important object of this invention is to provide a device of this character, which may be readily mounted on flat or vertical surfaces, and which will be low in cost as well as being sturdy and efficient for the purposes intended.

A meritorious feature of the present invention resides in the means provided for permitting adjustment of the mirrors while retaining the mirrors in such a relation to each other that their axes are co-planar.

Yet another outstanding feature of the present invention resides in its simplicity and corresponding low cost of manufacture, together with the fact that the construction is of such a character that the same lends itself to fabrication from a wide range of material such as plastics, metals, etc.

A final important feature of the present invention to be specifically enumerated herein resides in the supporting means for the frame of the unit, such supporting means being of such a character that the unit may be secured to a vertical wall or simply placed upon a horizontal surface.

These, together with various ancillary objects and features of the invention will become apparent as the following description proceeds, are attained by the present invention. a preferred embodiment of which has been illustrated by way of example only in the accompanying drawings, wherein:

Figure 1 is a side elevational view of the present invention showing the same mounted upon a wall in position for use, and in which an alternative position of the supporting arms is shown in phantom lines;

Figure 2 is a bottom plan view of the construction shown in Figure 1, and is taken from the plane of the line 2—2 in Figure 1;

Figure 3 is an enlarged detail view, partially in section, of the construction shown in Figure 1, this view being taken in the direction of the arrows 3—3 in Figure 1 and from the plane of the suporting wall;

Figure 4 is an enlarged sectional detail view taken approximately upon the plane of the section line 4—4 in Figure 3;

Figure 5 is an enlarged sectional detail view taken upon the plane of the section line 5—5 in Figure 3;

Figure 6 is a side elevational view of another embodiment of the invention;

Figure 7 is a bottom plan view of the form of the invention shown in Figure 6; and, Figure 8 is an enlarged sectional detail view taken upon the plane of the section line 8—8 in Figure 6.

Reference is now made more specifically to the accompanying drawings, wherein like numerals designate similar parts throughout the various views, and in which attention is first directed to the embodiment of the invention illustrated in Figures 1–5.

As clearly shown in Figures 1 and 2, the mirror unit 10 comprises an arcuate frame 12 formed of parallel members 14 connected at one end by a member 16. Obviously, the members 14 and 16 may be formed from a single length of material if desired.

A pair of support arms 18 are pivoted at 20 to the ends of the frame members 14 remote from the member 16, each of the arms 18 being bent through an acute angle, as at 22, so that the arms 18 extend from the frame 12 in divergent relation to each other. As will be evident upon inspection of Figure 3, a threaded pin 24 provided with an enlarged knurled head 26 forms a pivotal connection between each of the members 14 and arms 18, the arrangement being such that the head 26 may be tightened to clamp the members 14 and 18 in adjusted angular relation.

The arms 18 may be adjusted to extend in the horizontal position shown in phantom lines 28 shown in Figure 1, and the outer extremities of the arms 18 are weighted by means to be explained presently so that when the arms 18 are in the position shown in phantom lines 28 in Figure 1 that the arms 18 may be rested upon a flat supporting surface to support the frame 12 in the attitude shown in Figure 1.

The construction of the weighted extremities of the arms 18 is shown in Figures 3 and 5, wherein it will be seen that the outer extremity of the arms 18 is enlarged and formed in the shape of a hemispherical shell 30 in which is received a relatively thick hemispherical shell 32, and a circular disk 34 is also placed in the shell 30, and the disk 34 and the shell 32 are retained within the shell 30 by means of the latter having an inturned peripheral rim or flange 36. The disk 34 is provided with a keyhole slot 38 for receiving the head of a nail 40 when the arms 18 are placed in the full line position shown thereof in Figure 1, it being understood that the nail 40 is driven into a suitable supporting wall 42. Thus, it will be seen that the shell 32 serves to weight the outer extremity of the arm 18 when the latter is to be used in the horizontal position, and that the construction also affords means for attaching the arm 18 to a vertical wall.

A plurality of mirrors 44, 46, 48, and 50 are carried by means to be presently described at spaced intervals along the length of the frame 12. Inasmuch as the means for mounting each of the mirrors to the frame 12 is identical, and since each of the mirrors are themselves identical, it is believed that it will suffice to specifically describe only one of such mirrors and the means for mounting the same on the frame 12. As clearly shown in Figures 2, 3, and 4, the mirror 44 includes a casing 52 provided with diametrically opposed, oppositely extending trunnions 54. A pair of rings 56 are slidably mounted on the frame members 14, such rings 56 being provided with set screws 58 having enlarged knurled heads 60 for securing the rings 56 in adjusted position on the frame members 14. In addition, the rings 56 are provided with suitable openings 62 in which are journaled the outer end portions of the trunnions 54, as clearly shown in Figure 4. The outer extremities of the trunnions 54 are outwardly flared as at 64 so that the trunnions 54 are retained against being displaced from within the openings 62, and in addition, the outer extremities 64 of the trunnions 54 project a sufficient distance into the rings 56, so that the extremities 64 bear against the frame members 14 when the set screws 58 are tightened. It will thus be seen that when the set screws 58 are loosened, the rings 56 may be moved along the frame members 14, and thus the mirror 44 may be rotated about the axis of the trunnions. However, when the set screws 58 are tightened, the frictional engagement of the outer extremities 64 of the trunnions 54 with the frame members 14 prevent or resist rotation of the mirror 44.

In operation, the person 66 utilizing the mirror unit 10 positions herself as shown in Figure 1, and the mirrors 44, 48 and 50 are adjusted so that the rear of the person's head may be seen upon viewing mirror 44. It will be understood that the character of the mounting means for the mirrors confines the mirrors to movements in which the axes of all the mirrors are retained in a single plane, and that by such an arrangement the ease with which the mirrors 44, 48 and 50 are adjusted to meet a particular requirement is facilitated. By properly adjusting the mirror 46, the person 66 may tilt her head back only to a slight extent to view in the mirror 46 the reflection of the front part of her head, and it will be obvious that, by virtue of the provision of mirror 46, the adjustment of the mirrors 44, 48 and 50 need not be disturbed. It will also be noted that the position of the mirror 46 with respect to the mirrors 44 and 48 is such that the mirror 48 does not interfere with the passage of light between the mirrors 44 and 48.

While in the form of the invention shown in Figures 1–5 the frame 12 has been shown as being formed of tubular members 14, it will be readily appreciated that the frame members 14 may be of any desired cross-sectional configuration, the tubular form being preferred in this construction because of the high strength weight ratio of such shaped members.

Attention is now directed to the form of the invention shown in Figures 5–8, wherein it will be seen that a frame 70 is provided which is formed of a pair of arcuate bars 72 disposed in spaced parallel relation and connected together at one end, as at 74, so that the frame 70 may be formed from a single strip of bar stock, if desired.

In order to support the frame 70 upon a horizontal surface, a pair of divergent support arms 76 is provided, the adjacent ends of which are interposed between the bars 72 at the end of the frame 70 opposite the connection 74. The arms 76 are pivotally secured to the bars 72 by means of a clamping screw 78, the arrangement being such that upon loosening the screw 78, the angular positions of the arms 76 may be adjusted with respect to the frame 70, and upon tightening the screw 78, the arms 76 may be secured in fixed angular relationship.

A plurality of mirrors 80, 82 and 84 are suitably mounted by means to be presently described at spaced intervals along the frame 70. The mounting means for the mirrors 80, 82 and 84 permit angular adjustment of the mirrors as well as adjustment along the length of the frame 70, and such means comprises each of the mirrors including a casing 86 formed with a radially projecting finger 88. The fingers 88 extend between the bars or frame members 72, and are retained therein by means of bolts 90 and nuts 92 threaded upon the bolts 90, such bolts 90 extending through sets of elongated slots 94 formed in the frame members 72, as well as through a suitable aperture in each of the fingers 88.

Additional sets of slots 94 are provided in the frame 70 in the event it is desired to secure additional mirrors to the frame 70.

As will be evident, loosening of the nuts 92 on the bolts 90 permit the mirrors to be adjusted longitudinally of the slots 94 and to rotate about the axis of the bolts 90, while tightening of such nuts 92 secure the mirrors in adjusted relation.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claim.

Having described the invention, what is claimed as new is:

In a mirror unit of the type described, the combination of a pair of spaced parallel rod-like members, a pair of tubular sleeves slidable on the respective members, a mirror disposed between said members, a pair of coaxial trunnions on said mirror provided with diametrically reduced outer end portions terminating in relatively enlarged heads, said sleeves having inner side portions thereof formed with apertures and countersinks at the inner ends of said apertures to rotatably receive said diametrically reduced portions and heads respectively, and set screws carried by outer side portions of said sleeves in axial alignment with said trunnions, whereby said heads may be frictionally engaged with said rod-like members to simultaneously lock the sleeves against sliding on the rod-like members and lock the trunnions against rotation relative to the sleeves.

GABRIEL P. FUENTES.

REFERENCES CITED

The following references are of record in the file of this patent:

UNITED STATES PATENTS

| Number | Name | Date |
| --- | --- | --- |
| 664,522 | Wright | Dec. 25, 1900 |
| 862,833 | May | Aug. 6, 1907 |
| 1,050,321 | Winzenburg | Jan. 14, 1913 |
| 1,395,812 | Gerber | Nov. 1, 1921 |
| 1,584,938 | Higbee | May 18, 1926 |
| 1,900,557 | Holcombe | Mar. 7, 1933 |